United States Patent
Futamura et al.

(10) Patent No.: US 6,415,597 B1
(45) Date of Patent: Jul. 9, 2002

(54) SWITCHABLY COUPLED TURBOFAN ENGINES FOR HIGH SPEED AIRCRAFT

(75) Inventors: Hisao Futamura, Tokyo; Hideyuki Taguchi, Murayama, both of (JP)

(73) Assignee: National Aerospace Laboratory of Science and Technology Agency, Tokyo (JP)

( * ) Notice: Subject to any disclaimer, the term of this patent is extended or adjusted under 35 U.S.C. 154(b) by 41 days.

(21) Appl. No.: 09/621,333

(22) Filed: Jul. 21, 2000

(30) Foreign Application Priority Data

Nov. 10, 1999 (JP) ............................. 11-319389

(51) Int. Cl.[7] .............................. F02K 9/78; F02K 3/02
(52) U.S. Cl. ..................... 60/224; 60/226.1; 60/226.3
(58) Field of Search ...................... 60/224, 225, 226.1, 60/226.3, 39.15

(56) References Cited

U.S. PATENT DOCUMENTS

| | | | |
|---|---|---|---|
| 3,368,352 A | * | 2/1968 | Hewson ..................... 60/226.1 |
| 3,659,422 A | | 5/1972 | Hope |
| 3,841,091 A | | 10/1974 | Sargisson et al. |
| 4,679,394 A | * | 7/1987 | Taylor ......................... 60/224 |

* cited by examiner

*Primary Examiner*—Charles G. Freay
(74) *Attorney, Agent, or Firm*—Armstrong, Westerman & Hattori, LLP

(57) ABSTRACT

A jet engine for supersonic aircraft which enables supersonic flight and high fuel efficiency to be achieved while suppressing noise at take-off. The engine comprises a front engine consisting of a turbofan engine, and a rear engine or engines consisting of a turbofan or turbojet engine disposed to the rear of said front engine, the rear engine(s) being coupled switchably by a tube to the bypass duct of the front engine, the air inlet(s) of the rear engine(s) being coupled to the bypass duct during supersonic flight, or during acceleration to supersonic speed, whereby the pressure and temperature of the bypass air from the front engine is raised by the rear engine(s), and the air inlet(s) of the rear engine(s) being separated from the bypass duct during take-off, in such a manner that the bypass air is discharged without the temperature or pressure thereof being raised further.

4 Claims, 3 Drawing Sheets

FIG. 1-A
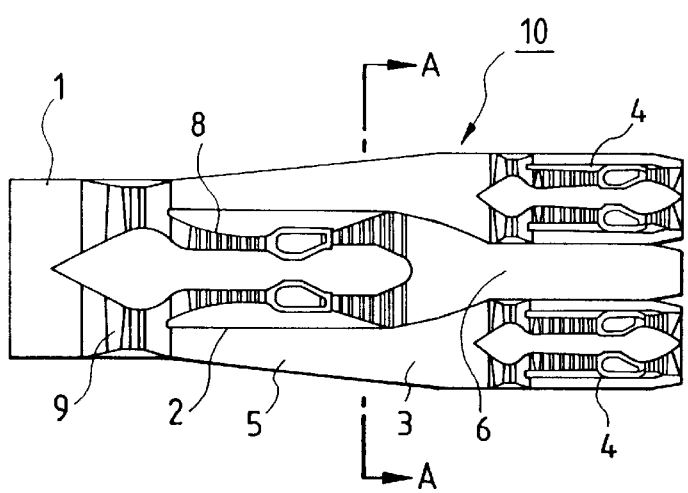
FIG. 1-B
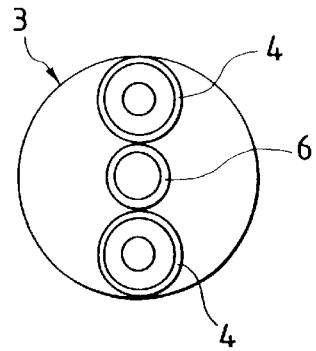
FIG. 2
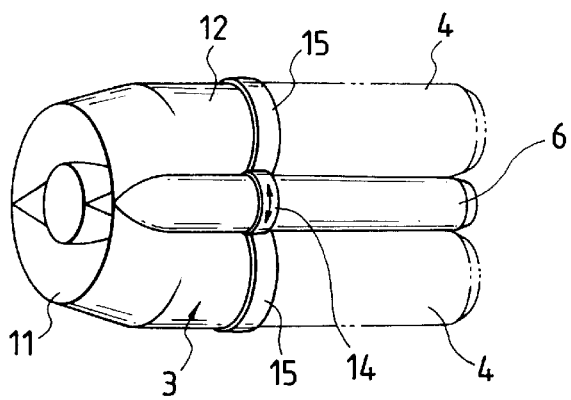
FIG. 3-A
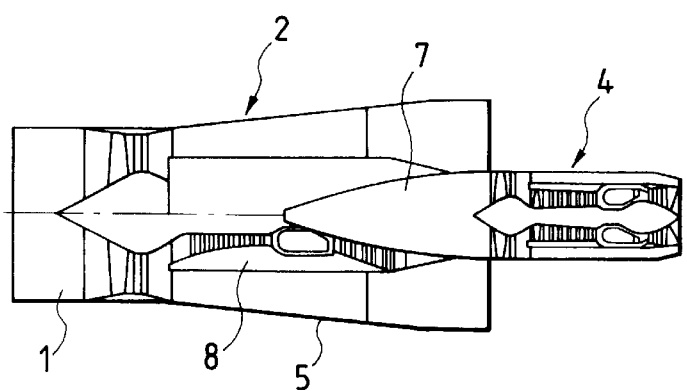
FIG. 3-B
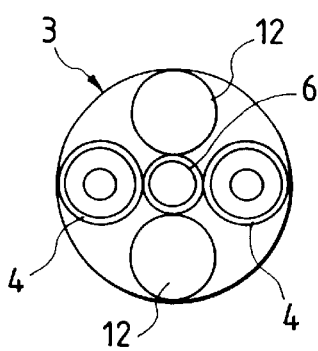

SWITCHABLY COUPLED TURBOFAN ENGINES FOR HIGH SPEED AIRCRAFT

BACKGROUND OF THE INVENTION

1. Field of the Invention

The present invention relates to a jet engine for a high-speed aircraft, and more particularly, a jet engine suitable for propelling an aircraft flying at either supersonic speed or subsonic speed.

2. Description of the Related Art

In a supersonic aircraft, the exhaust gas must be raised to high temperature and high velocity, in order to obtain high thrust for take-off or supersonic flight. However, in a conventional turbojet engine, it has not been possible to obtain the exhaust gas temperature required for supersonic flight, as a result of limitations on the turbine inlet temperature.

On the other hand, with a view to achieving high temperature and high velocity of the exhaust gas, turbojet engines with afterburners and turbofan engines with afterburners have been developed for practical use. However, an engine with an afterburner has a disadvantage in that the noise generated by the engine is excessively loud, because the speed of the exhaust gas is very high, particularly at take-off.

Therefore, in order to reduce noise at take-off, while obtaining a high exhaust gas temperature during supersonic flight, engines incorporating a variable mechanism for changing, for instance, the bypass ratio inside the engine, have been proposed and researched, but satisfactory results have not yet been obtained. Moreover, U.S. Pat. No. 3,841,091 discloses a jet engine wherein two turbojet engines are coupled, one in front of the other, and bypass air is fed to one of the turbojet engines by switching the air path, but this does not enable light weight or a more compact size to be achieved.

SUMMARY OF THE INVENTION

The present invention was devised with the foregoing in view, an object being to provide a jet engine providing high thrust, while reducing the problems of noise and weight at take-off, for an aircraft flying at high speed, in particular, either supersonic speed or subsonic speed.

In order to achieve the aforementioned object, the jet engine for a high-speed aircraft according to the present invention is a jet engine for a high-speed aircraft, comprising: a front engine consisting of a turbofan engine; and a rear engine consisting of at least one turbofan engine or turbojet engine disposed to the rear of the front engine; wherein the rear engine is coupled to a bypass duct of the front engine by means of a tube, and the rear engine obtains thrust by raising the pressure and temperature of the bypass air from the front engine.

According to the foregoing composition, it is possible to raise the temperature and pressure of bypass air from a low-noise turbofan engine by use of a separately disposed single or plurality of turbojet engines or turbofan engines, and therefore, because the bypass air can be discharged without the temperature or pressure thereof being further raised during take-off, it is possible to achieve a jet engine for a supersonic aircraft which enables take-off at low noise level. The aforementioned turbofan engine may be a front fan-type or after fan-type engine.

A further jet engine for a high-speed aircraft according to the present invention seeking to resolve the aforementioned problems is a jet engine for a high-speed aircraft, comprising: a front engine consisting of a turbofan engine; and a rear engine consisting of at least one turbofan engine or turbojet engine disposed to the rear of the front engine; the rear engine further comprising intake air switching means capable of switching the rear engine between a bypass air intake state, wherein the rear engine takes in bypass air from the front engine, and an external air intake state, wherein the rear engine takes in external air directly.

The aforementioned intake air switching means may be accomplished in a variety of ways, for example, by tube switching means for switching a tube supplying bypass air from the front engine to the rear engine, external air being taken in by the rear engine via an auxiliary air inlet and thrust being obtained by means of the engine air flow being increased by the rear engine in combination with the front engine, when the pipe switching means switches to the external air intake position.

Furthermore, the intake air switching means may be constituted by rear engine displacing means for displacing the rear engine to a position outside the projected area of the front face of the front engine, external air being taken in by the rear engine and thrust being obtained by means of the engine air flow being increased by the rear engine in combination with the front engine, when the rear engine displacing means moves the rear engine to a position outside the projected area of the front face of the front engine.

The intake air switching means may also be constituted by front engine displacing means for displacing the front engine to a position outside the projected area of the front face of the rear engine. In this case, when the front engine displacing means moves the front engine to a position outside the projected area of the front face of the rear engine, a relatively large thrust can be obtained by means of the engine exhaust being increased, in a similar manner to a case where the rear engine is moved.

BRIEF DESCRIPTION OF THE DRAWINGS

FIGS. 1-A and 1-B are sectional conceptual views of a jet engine for a high-speed aircraft of a first embodiment of the present invention, during cruising flight;

FIG. 2 is a general oblique view of the jet engine for a high-speed aircraft illustrated in FIG. 1;

FIGS. 3-A and 3-B are sectional conceptual views showing a state wherein the rear engines in FIG. 1 have been rotated to a second position;

DETAILED DESCRIPTION OF THE PREFERRED EMBODIMENTS

Figure 4:
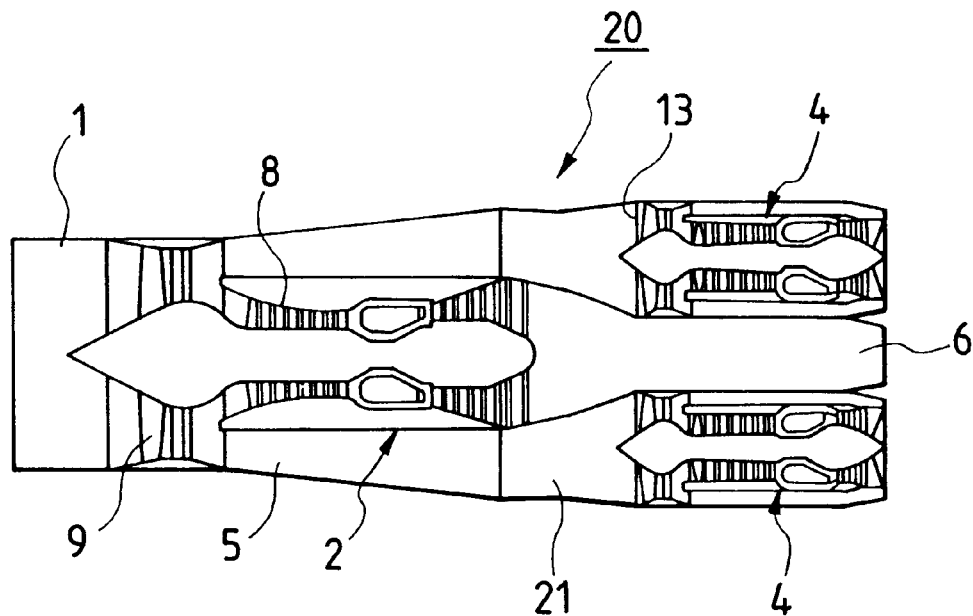
FIG. 4 is a sectional conceptual view showing a state wherein air is introduced into rear engines by switching a connecting tube in a jet engine for a high-speed aircraft of a second embodiment of the present invention.

Below, the present invention is described on the basis of various embodiments, with reference to the accompanying drawings, but the present invention is not limited to these embodiments. Moreover, the description of the following embodiments relates to cases where the present invention is applied to a supersonic aircraft, but the present invention may of course also be applied to a subsonic aircraft.

FIG. 1–FIG. 3 are sectional conceptual views showing a jet engine for a high-speed aircraft of a first embodiment of the present invention. FIGS. 1-A and 1-B illustrate a state where the aircraft is flying at supersonic speed or subsonic speed, and FIGS. 3-A and 3-B illustrate a state where the aircraft is taking off or accelerating and climbing at subsonic speed.

The jet engine 10 for a high-speed aircraft according to the first embodiment comprises, in combination, a front engine 2 consisting of a turbofan engine, and two rear engines 4 provided to the rear of the front engine 2 via a connecting tube 3. The turbofan engine used for the front engine may be either a front fan-type or after fan-type engine, and in the first embodiment a front fan-type engine is used. Moreover, for the rear engines 4, it is possible to use either turbofan engines or turbojet engines, and in the present embodiment, two turbofan engines are used. The rear engines 4 are disposed to the outer side of the exhaust nozzle 6 of the core engine 8 in the front engine 2, in such a manner that the exhaust from the core engine 8 does not enter into the rear engines, but rather, is discharged rearwards from an exhaust nozzle 6 of the core engine disposed between the rear engines.

As illustrated in FIG. 2, the connecting tube 3 is a bypass duct connecting cylinder, the upstream inlet of which is connected to the rear end of a bypass duct 5, and the downstream end portion of which branches at an intermediate position into two rear engine connecting cylinders 12 separated by 180°, in such a manner that it can be connected to the air inlets of the rear engines 4. As illustrated in FIGS. 1-A and 1-B, the aforementioned pair of rear engines 4 are installed in such a manner that they can be driven and rotated by suitable rotating means about the central axis of the front engine, between a first position wherein the rear engine air inlet 13 couples with the a rear engine connecting cylinder 12 of the connecting tube 3 provided to the rear of the bypass duct 5 of the front engine 2, and a second position, rotated through 90° from the state in FIG. 1 about the central axis of the front engine, and hence separated from the connecting tube 3, as illustrated in FIGS. 3-A and 3-B.

In the second position, the air inlet 13 of the rear engine is connected to a separately disposed auxiliary air inlet 7. For the aforementioned rotating means, as illustrated in FIG. 2, for example, a bearing 14 is provided rotatably on the outer circumference of the exhaust nozzle 6 of the front engine 2, and a rear engine fixing ring 15 for supporting the rear engine 4 on the bearing 14 is provided integrally with same, the rear engines being moved in an unified fashion by rotating the bearing 14 about the central axis of the front engine by means of a suitable actuator provided in the main body of the aircraft, or the like.

The jet engine 10 for a high-speed aircraft according to the present embodiment is constituted as described above, and during take-off and when climbing and accelerating at subsonic speed, the rear engines are positioned in the second position, as illustrated in FIGS. 3-A and 3-B, wherein the bypass air from the front engine 2 does not enter into the rear engines, and hence, in addition to air entering into the front engine 2 by means of the front engine air inlet 1, air is also directed into the rear engines 4 via the separately disposed auxiliary air inlet 7, the air compressed by the rear engines 4 being discharged rearwards, separately from the bypass air from the front engine.

On the other hand, during acceleration to supersonic speed, or during cruising flight at supersonic speed or cruising flight at subsonic speed, the rear engines 4 are rotated to the first position and the rear engine air inlets 13 are coupled to the connecting tube 3 provided to the rear of the bypass duct 5 of the front engine 4, whereby bypass air generated by air entering into the front engine 2 by means of the front engine air inlet 1 and being compressed by the front engine 2 is directed from the bypass duct 5, via the connecting tube 3 and into the rear engines 4, where the temperature and pressure thereof is raised further by the two rear engines 4, 4, producing a high-speed gas flow which is discharged in a rearward direction. Thereby, it is possible to obtain the high thrust required during supersonic flight or acceleration to supersonic flight.

Furthermore, during cruising flight at subsonic speed, bypass air 5 generated by air entering into the front engine 2 via the front engine air inlet 1 and being compressed in the front engine is similarly directed via the connecting tube 3 into the rear engines 4, but during subsonic cruising flight, the output of the rear engines 4 is restricted, or the rear engines 4 are made to idle. Therefore, the air is discharged rearwards without the pressure or temperature thereof being raised significantly, and hence it is possible to maintain subsonic cruising flight.

Therefore, according to the engine relating to the first embodiment, because the flow volume of the engine exhaust gas can be increased during take-off, by introducing air directly into the rear engines, rather than introducing bypass air from the front engine into the rear engines, it is possible to reduce the amount of noise generated by the exhaust jets, and hence a jet engine for a supersonic aircraft can be obtained which enables take-off at low noise levels.

Furthermore, when cruising at supersonic speed or when accelerating to supersonic speed, it is also possible to obtain high thrust without the use of afterburners, by raising the temperature and the pressure of the bypass air from the front engine. By dispensing with afterburners, it is possible to achieve high combustion efficiency, and therefore fuel consumption equivalent to that of a conventional turbofan jet engine can be achieved, while the amount of unburned hydrocarbons and nitrogen oxides in the exhaust gas is reduced.

FIG. 4 is a sectional conceptual view showing a jet engine for a high-speed aircraft of a second embodiment of the present invention. This diagram illustrates a state wherein two rear engines 4 are provided and the aircraft is taking off, or climbing or accelerating at subsonic speed. In this at diagram, constituent elements that are similar to those in the embodiment described above are similarly labeled.

The jet engine 20 for a high-speed aircraft according to the second embodiment is similar to the first embodiment described above in terms of basic composition, but in this second embodiment, rather than changing the position of the rear engines by rotating same about a central axis, as intake air switching means for switching the rear engines between a state where they take in bypass air from a front engine, and a state where they take in external air, tube switching means is provided for performing switching by rotating the connecting tube.

Figure 5:
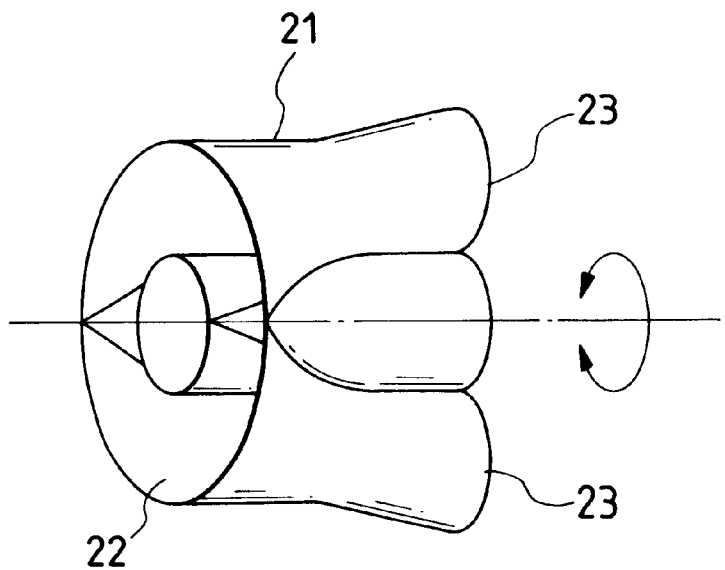
FIG. 5 is a general oblique view of the connecting tube in the jet engine for a high-speed aircraft illustrated in FIG. 4.

Specifically, a connecting tube 21 in the second embodiment is supported on the bypass duct of the front engine 2, in such a fashion that it can be driven and rotated between a bypass air intake position and an external air intake position. The connecting tube 21 is fixed to the rear engines in a uniform position. As illustrated in FIG. 5, the upstream section of the connecting tube 21 forms a bypass duct connecting cylinder 22, and the downstream portion thereof is formed into two rear engine connecting cylinders 23.

By constituting the second embodiment in the aforementioned manner and switching the connecting tube 14 to the external air intake position during take-off, or when climbing or accelerating at subsonic speed, air enters into the front engine 2 by means of the front engine air inlet 1, while at the same time, air enters directly into the rear engines 4 by means of separately disposed auxiliary air inlets, and therefore, air compressed by each set of engines is discharged rearwards in an independent fashion. On the other hand, during acceleration to supersonic speed, cruising flight at supersonic speed, or cruising flight at subsonic speed, by rotating and switching the connecting tube 3 to the bypass air intake position, similarly to the first embodiment described above, the bypass air from the front engine 2 is introduced into the rear engines 4, and the temperature and pressure of the bypass air compressed by the front engine 2 is further raised by the two rear engines 4, 4, thereby forming a high-speed air flow, which is discharged rearwards.

Figure 6:
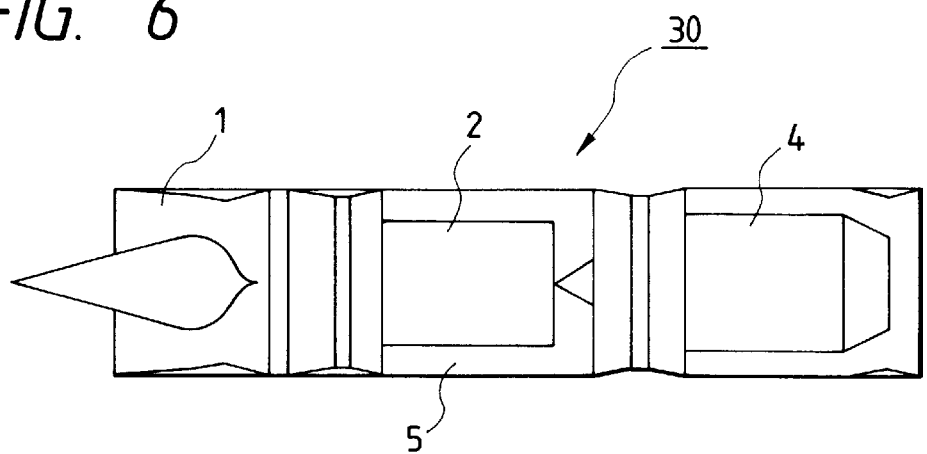
FIG. 6 is a sectional conceptual view showing a jet engine for a high-speed aircraft of a third embodiment of the present invention, during cruising flight.
Figure 7:
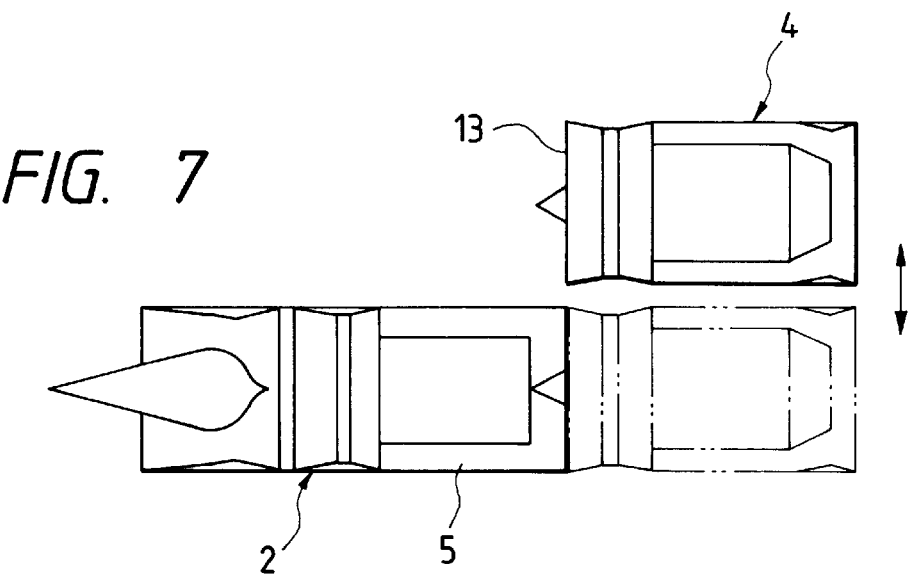
FIG. 7 is a sectional conceptual view showing a state wherein the rear engine in FIG. 6 has been moved linearly to a second position.

FIG. 6 and FIG. 7 are sectional conceptual views showing a third embodiment of a jet engine for a high-speed aircraft according to the present invention. The jet engine 30 for a high-speed aircraft according to the third embodiment comprises only one rear engine 4, this rear engine 4 being provided in such a manner that it can be moved in a linear fashion by rear engine displacing means, between a first position where it is located within the projected area of the front face of the front engine, and a second position where it is located outside the projected area of the front face of the front engine. For the rear engine displacing means, a suitable mechanism can be employed, for instance, the rear engine being suspended from the main body of the aircraft by a link, and this link being caused to move in a linear fashion, perpendicularly to the axis thereof, in a horizontal plane, by means of a suitable actuator.

When the rear engine 4 is located in the first position, as illustrated in FIG. 6, the rear engine air inlet 13 connects with the bypass duct of the front engine 2, in such a manner that bypass air can enter into the rear engine. When the rear engine 4 is located in the second position, as indicated by the solid lines in FIG. 7, the rear engine air inlet 13 is separated from the bypass duct 5 of the front engine, in such a manner that air can enter into the rear engine directly.

Therefore, by fixing the rear engine in the first position during cruising flight at supersonic speed or acceleration to supersonic speed, air is introduced into the front engine 2 via the front engine air inlet 1, and the bypass air compressed by the front engine is directed into the rear engine 4, where the temperature and pressure of the air is further raised, producing a high-speed gas flow which is discharged in a rearward direction.

By fixing the rear engine in the first position during subsonic cruising flight also, bypass air generated by air entering into the front engine 2 via the front engine air inlet 1 and being compressed by the front engine is directed into the rear engine 4, but by restricting the output of the rear engine, or setting the rear engine to idle, the air can be discharged rearwards without the temperature or pressure thereof being raised significantly.

On the other hand, by moving and fixing the rear engine in the second position during take-off, or when climbing or accelerating at subsonic speed, air enters into the front engine 2 by means of the front engine air inlet 1, while at the same time, outside air enters into the rear engine 4 as a result of the rear engine 4 being moved to a position outside the projected area of the front face of the front engine, and hence air compressed by each engine is discharged rearwards in an independent fashion.

Figure 8:
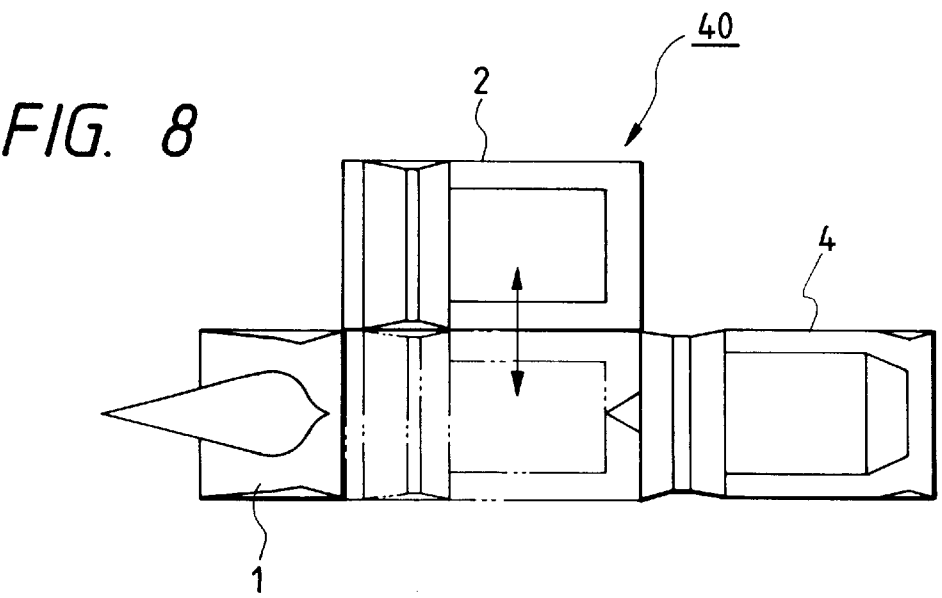
FIG. 8 is a sectional conceptual view showing a state wherein the front engine of a jet engine for a high-speed aircraft of a fourth embodiment of the present invention has been moved linearly to a second position.

FIG. 8 is a sectional conceptual view showing a fourth embodiment of the present invention. In the jet engine 40 for a high-speed aircraft according to the fourth embodiment, instead of moving a rear engine 4 as in the foregoing embodiments, a front engine 2 is moved between a first position and a second position with respect to a rear engine. FIG. 8 shows a state where one rear engine 4 is provided, and the aircraft is taking off, or climbing or accelerating at subsonic speed.

During take-off or when climbing or accelerating at subsonic speed, by moving the front engine 2 to a position outside the projection of the front face of the rear engine 4 and the front engine air inlet 1, air enters into the front engine 2, while at the same time, air enters into the rear engine 4 also, via an auxiliary air inlet which is created when the front engine 2 moves position, and hence air compressed by each engine is discharged rearwards, in an independent fashion. During cruising flight at supersonic speed, acceleration to supersonic speed, or cruising flight at subsonic speed, by moving the front engine to the state illustrated in FIG. 4, a similar effect is obtained to that described previously.

As described above, according to the present invention, it is possible to provide an engine which is capable of significant variation in exhaust gas velocity, in accordance with various states of flight, from take-off to supersonic cruising flight, without requiring a complex mechanism, and hence high-efficiency aircraft flight can be achieved from subsonic speeds through to supersonic speeds. In particular, because it is possible to increase engine thrust at take-off without increasing the flow rate of the exhaust gas, by discharging air compressed respectively by a front engine and rear engine or engines, in an independent fashion, the noise generated by the exhaust jets can be reduced, and hence a jet engine for a supersonic aircraft can be achieved which enables low-noise take-off.

What is claimed is:

1. A jet engine for a high-speed aircraft, comprising:

a front engine consisting of a turbofan engine; and a rear engine consisting of at least one turbofan engine or turbojet engine disposed to the rear of said front engine, wherein said rear engine comprises an air switching means capable of switching said rear engine between a bypass air intake state, wherein said rear engine takes in bypass air from said front engine, and an external air intake.

2. The jet engine according to claim 1, wherein said intake air switching means comprises a tube switching means for switching a tube supplying bypass air from said front engine to said rear engine, external air being taken in by the rear engine via an auxiliary air inlet, said rear engine in combination with said front engine developing thrust by increasing the engine air flow when said tube switching means switches to the external air intake position.

3. The jet engine according to claim 1, wherein said intake air switching means comprises a rear engine displacing means for displacing said rear engine to a position outside the projected area of the front face of said front engine, external air being taken in by said rear engine, said rear engine in combination with said front engine developing thrust by increasing the engine air flow when said rear engine displacing means moves said rear engine to a position outside the projected area of the front face of said front engine.

4. The jet engine according to claim 1, wherein said intake air switching means comprises a front engine displacing means for displacing said front engine to a position outside the projected area of the front face of said rear engine, external air being taken in by said rear engine, said rear engine in combination with said front engine developing thrust by increasing the engine exhaust when said front engine displacing means moves said front engine to a position outside the projected area of the front face of said rear engine.

* * * * *